US005174022A

United States Patent [19]

Phillips et al.

[11] Patent Number: 5,174,022

[45] Date of Patent: Dec. 29, 1992

[54] APPARATUS AND METHOD OF TERMINATING A WIRE TO A TWO PART INSULATED TERMINAL

[75] Inventors: Howard C. Phillips, Harrisburg; David W. Orphanos, Mohrsville, both of Pa.

[73] Assignee: AMP Incorporated, Harrisburg, Pa.

[21] Appl. No.: 850,617

[22] Filed: Mar. 13, 1992

[51] Int. Cl.[5] ...................... H01R 43/04; B23P 19/02

[52] U.S. Cl. ........................................ 29/863; 29/753

[58] Field of Search ................ 29/753, 863, 845, 754, 29/566.2, 33 M, 564.4, 748, 450, 857, 858, 859, 517

[56] References Cited

U.S. PATENT DOCUMENTS 4,074,424 2/1978 Deshich et al. ...................... 29/753
4,139,937 2/1979 L'Homme ........................ 29/450 X
4,272,879 6/1981 Wigby et al. ..................... 29/863 X
4,426,772 1/1984 Collier et al. .................... 29/863 X
4,557,048 12/1985 Cordeiro .............................. 29/863
4,979,291 12/1990 Phillips et al. ....................... 29/863
5,109,602 5/1992 Fukuda et al. ....................... 29/845

*Primary Examiner*—Carl J. Arbes

[57] ABSTRACT

An apparatus and method are disclosed for terminating a wire to a terminal having a metal contact that is partially assembled to an insulating housing. The apparatus includes a stop that abuttingly engages a side of the contact within the interior of the housing. A stripper arm automatically moves the crimped and assembled terminal laterally so that it is clear of the stop arm for easy removal. The crimping and assembly operations are performed in a single cycle of the press ram.

14 Claims, 9 Drawing Sheets

APPARATUS AND METHOD OF TERMINATING A WIRE TO A TWO PART INSULATED TERMINAL

The present invention relates to an apparatus for applying an electrical terminal and insulated housing to an end of a wire.

BACKGROUND OF THE INVENTION

Apparatus for applying electrical terminals of the type having an insulated housing partially assembled thereto, typically require two workstations, one to crimp the terminal onto the wire and another to push the insulated housing over the crimped terminal. This, of course, requires that the wire be presented to each workstation in turn. Another apparatus, which is described in U.S. Pat. No. 4,557,048, which issued Dec. 10, 1985 to Cordeiro, performs both the crimping and pushing functions in a single workstation. The wire is securely clamped so that after the terminal is crimped onto the conductor, the upper crimp tooling can be withdrawn and the wire and terminal raised by the wire clamp, thereby leaving sufficient space around the crimped terminal to slide the insulated housing thereover. Such an apparatus, of necessity, is somewhat complex and is costly to manufacture and maintain. U.S. Pat. No. 4,979,291 which issued Dec. 25, 1990 to Phillips, et al. and is incorporated by reference as though set forth verbatim herein, discloses a two part terminal applicator that does not require a movable wire clamp to provide space to slide the insulated housing over the crimped terminal. Further, a U-shaped stop member is utilized which engages the edges of the crimped contact to prevent axial movement of the wire and contact as the insulating housing is pushed into assembled engagement therewith. This arrangement is only effective with a straight type terminal. What is needed is a means of securing the contact of a two part flag terminal during assembly of the housing to the contact without causing undue bending of the wire and that permits the easy removal of the assembled and crimped terminal and wire.

SUMMARY OF THE INVENTION

A method and apparatus are provided for attaching an electrical terminal to the end of a wire, the terminal including a contact and an insulating housing. The terminal is positioned in a workstation having a stop so that a side of the contact is adjacent the stop. A wire to receive the electrical terminal is positioned in the workstation. The apparatus is then caused to crimp the contact to the end of the wire and then a force applied to move the housing in a direction toward the stop so that the side of the contact abuts the stop and the housing moves into assembled engagement with the contact. As the housing is moving into assembled engagement it engages and moves an ejection member in opposition to a resilient bias force. When the force applied to the housing is removed, the ejection member moves the assembled housing and contact away from the stop. The apparatus includes a workstation, stop means and means for positioning the electrical terminal in the workstation so that a side of the contact is adjacent the stop means. Means for terminating the contact to the wire is provided as well as means for moving the housing toward the stop means so that the contact abuts the stop means and the housing moves into assembled engagement with the contact. An ejection member is provided adjacent the stop means that is resiliently biased toward the housing and away from the stop means and is arranged to engage and move the housing away from the stop means when the means for moving the housing disengages the housing.

DESCRIPTION OF THE PREFERRED EMBODIMENT

Figure 1:
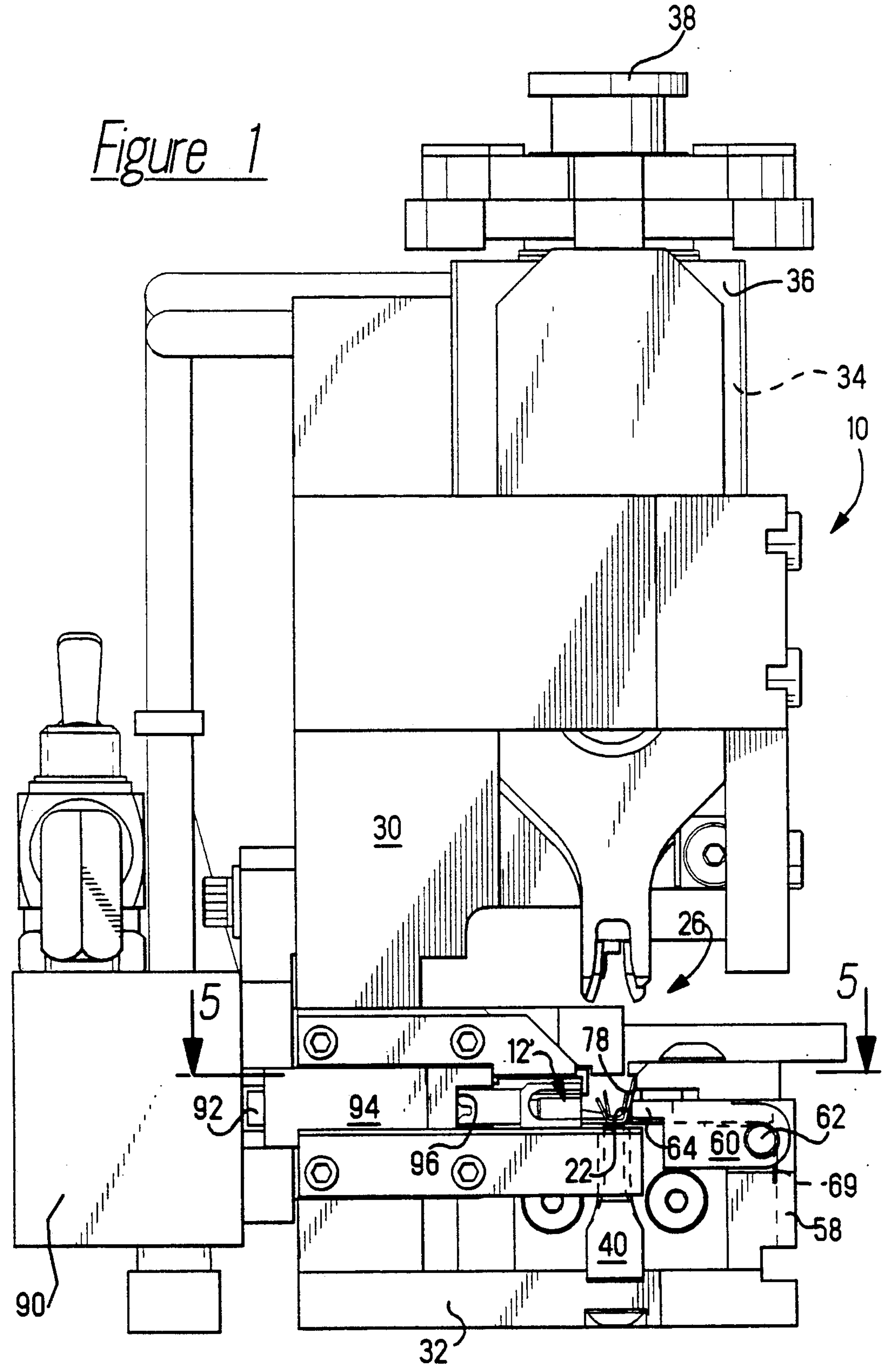
FIG. 1 is a front view of a terminal applicator incorporating the teachings of the present invention.
Figure 2:
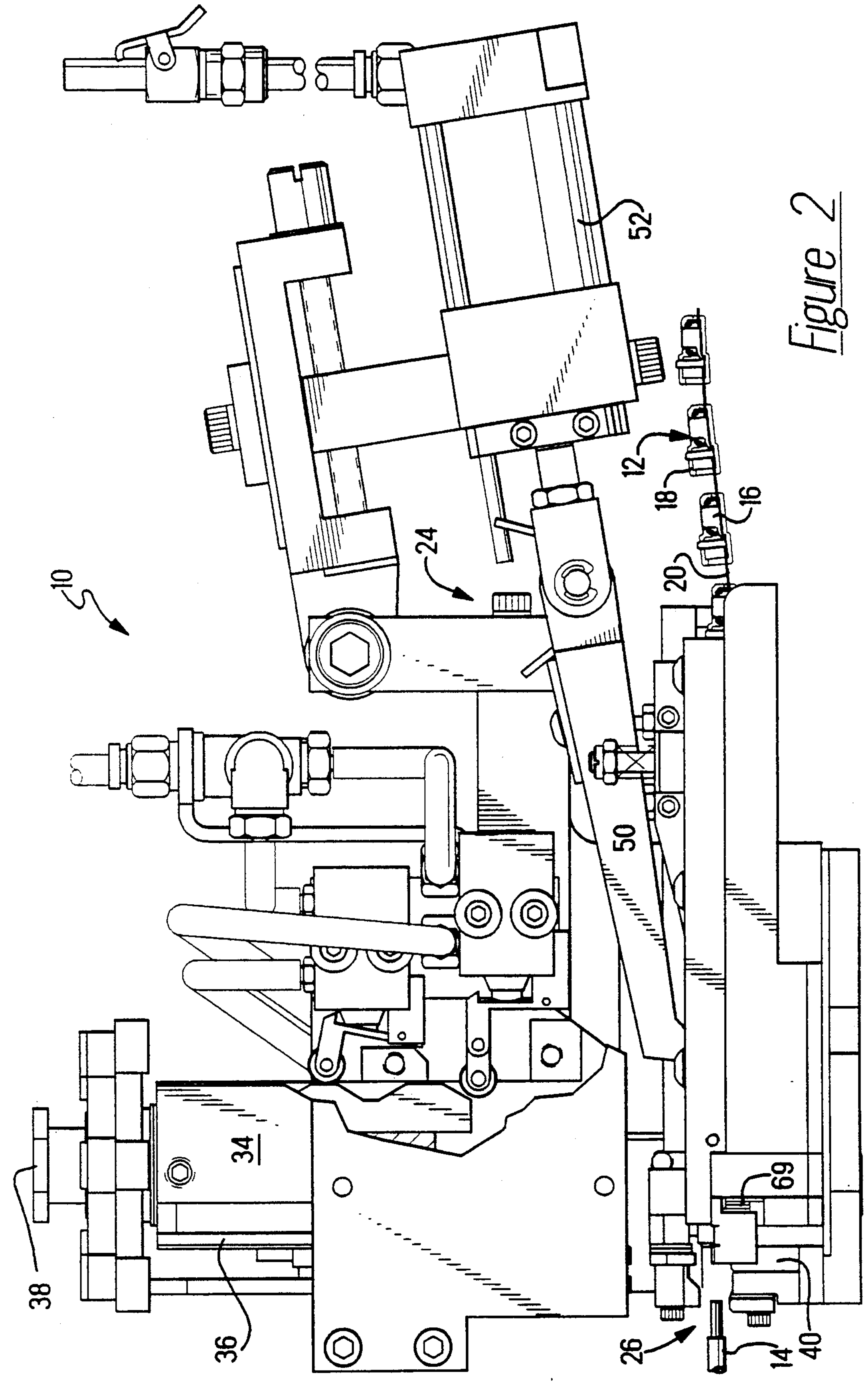
FIG. 2 is a side view of the applicator of FIG. 1.
Figure 3:
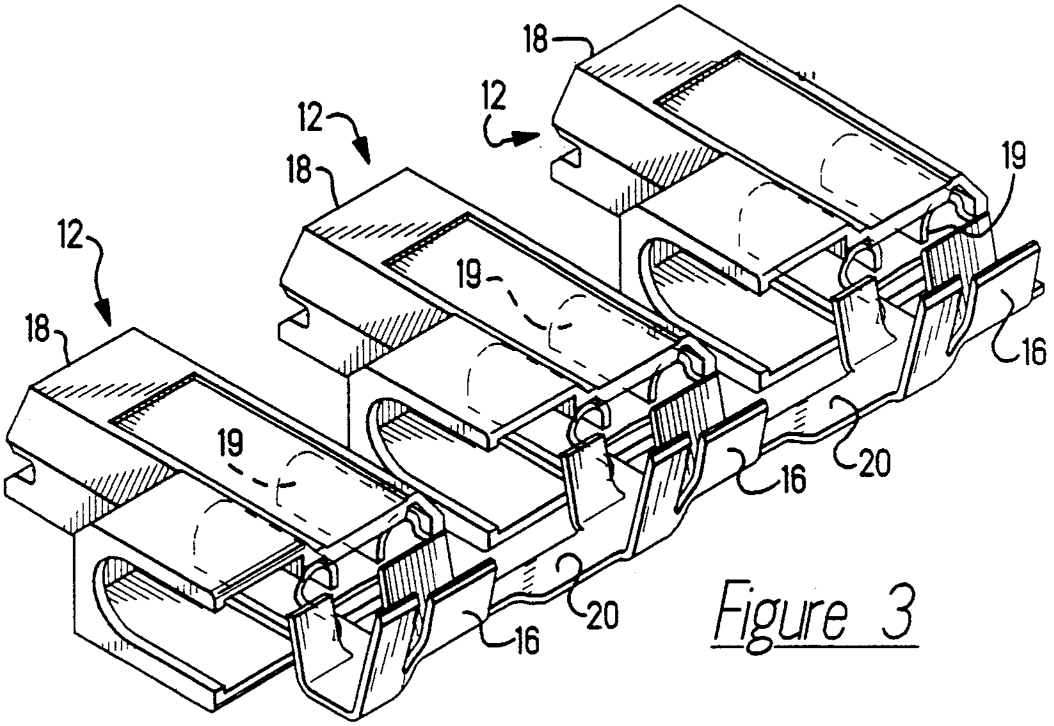
FIG. 3 is an isometric view of the two part terminals, in strip form, prior to assembly.
Figure 4:
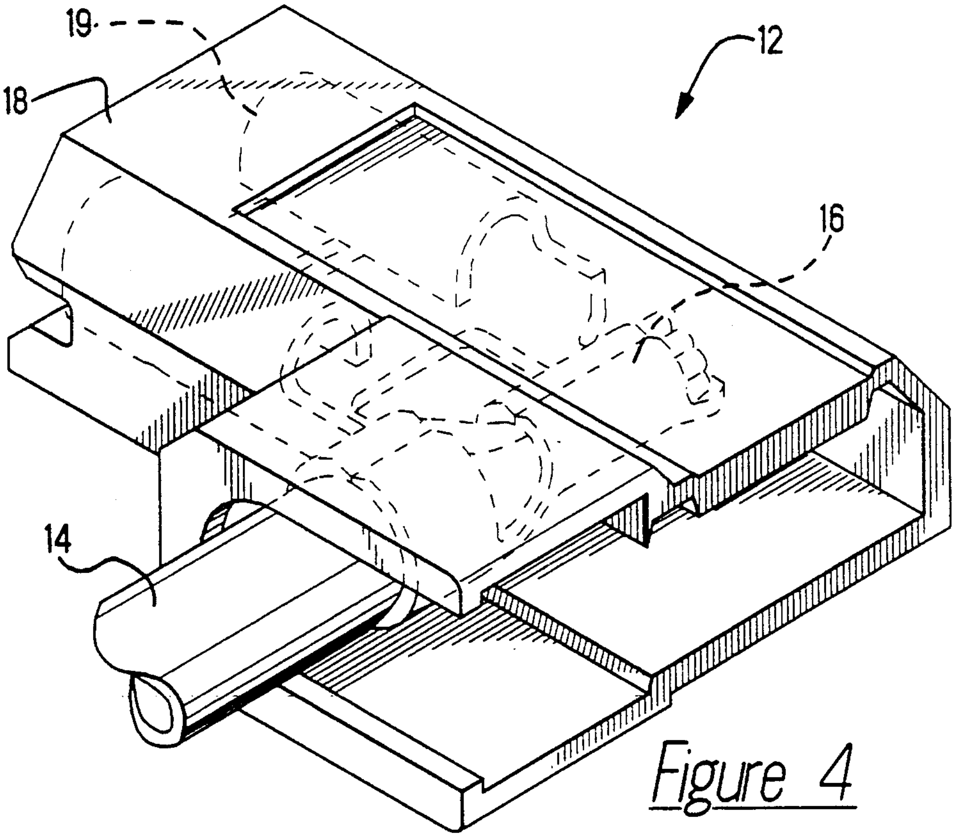
FIG. 4 is an isometric of one of the terminals of FIG. 3 shown assembled and terminated to a wire.

There is shown in FIGS. 1 and 2 an applicator 10 for applying terminals 12 to the end of a wire 14. The terminal 12 is the type having a contact 16 that is to be crimped to the wire 14 and an insulating housing 18 which is partly assembled to the contact as shown in FIG. 3. These are known as "flag" contacts because the receptacle portion 19 of the contact is directed at a right angle to the conductor 14, as best seen in FIG. 4. The terminal 12 is shown, in FIG. 4, with the wire 14 crimped to the contact 16 and the housing 18 in full assembled engagement with the contact. The terminals 12 are supplied on a reel, not shown, wherein each terminal 12 is interconnected by a carrier strip 20 in the usual manner. The carrier strip 20 and associated terminals 12 are fed along a guideway 22 by means of a feed mechanism 24 to a workstation 26. The applicator 10 includes a frame 30 and a base 32 rigidly attached together. The frame 30 is arranged to support the feed mechanism 24 and a ram 34 which carries a crimping tool 36 and is positioned directly above the workstation 26, as seen in FIGS. 1 and 2. The ram 34 includes the usual coupling 38 for operationally engaging a press, not shown, so that the ram 34 may be made to undergo reciprocating motion toward and away from the workstation 26. An anvil 40 is positioned on the base 32 directly under and in alignment with the crimping tool 36 so that as the tool 36 reciprocates, it moves into and out of crimping engagement with the anvil 40. The feed mechanism 24 is arranged to move the carrier strip 20 to the left, as viewed in FIG. 2, along the guideway 22 to position a single terminal 12' in the workstation directly on the anvil 40, as best seen in FIG. 1. The feed mechanism includes a pusher 50 which is actuated by a linear actuator 52, which, in the present example, is an air cylinder.

Figure 5:
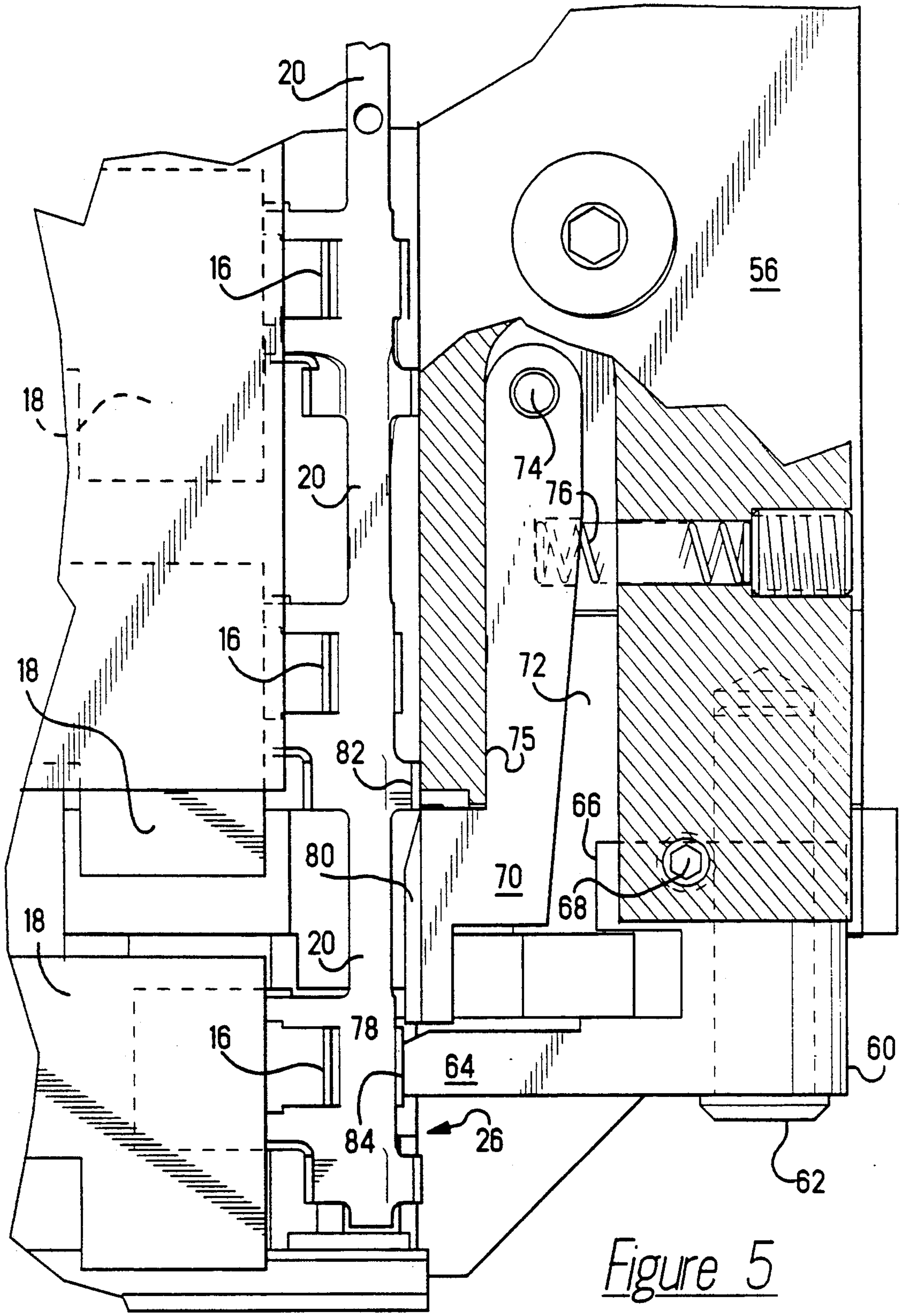
FIG. 5 is a partial cross-sectional view taken along the lines 5—5 of FIG. 1.
Figure 6:
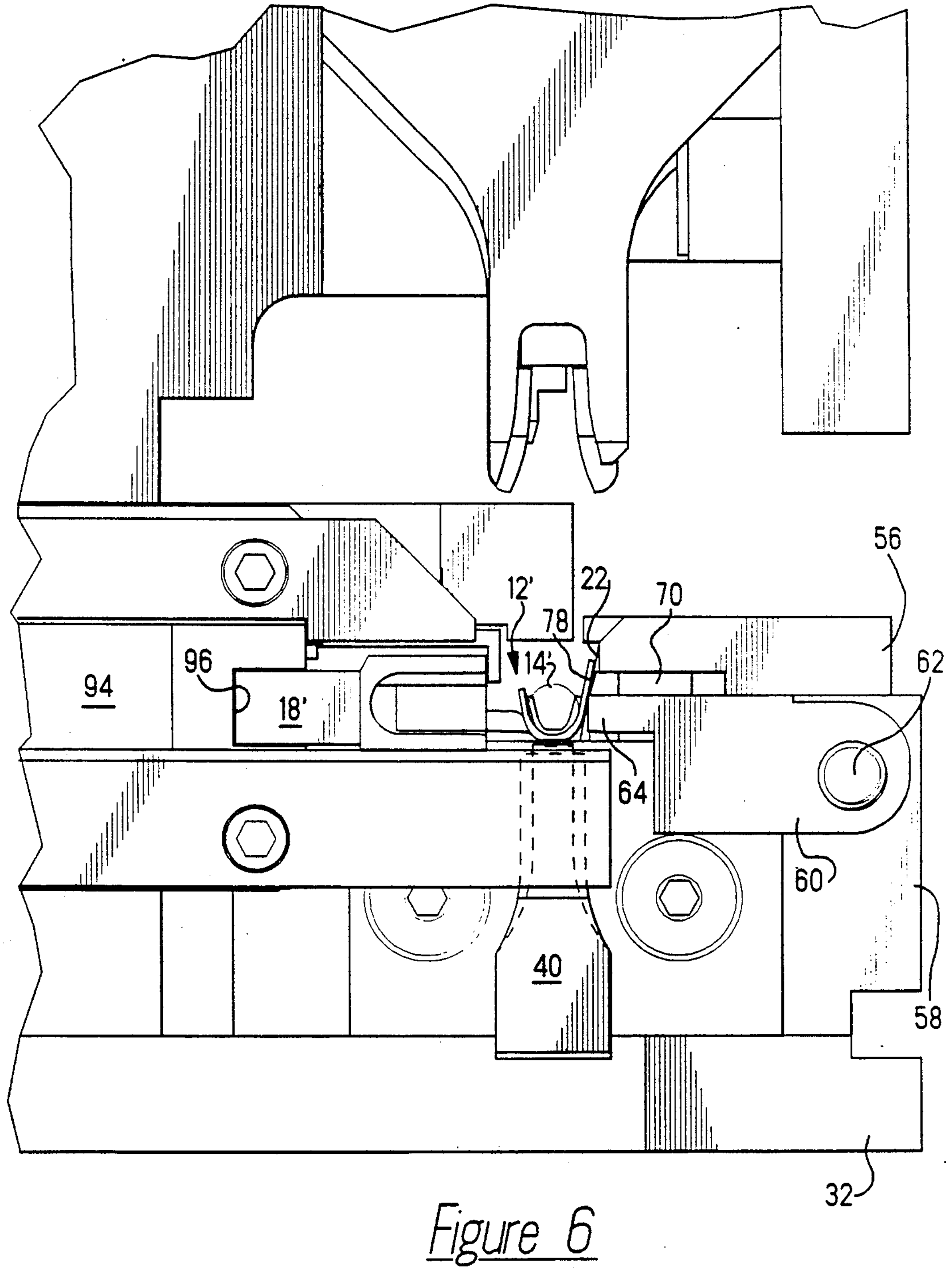
FIGS. 6 through 10 are partial front views of the applicator of FIG. 1 showing various portions of the operating cycle.

As best seen in FIG. 1, the guideway 22 is formed in a plate 56 which is attached to a support plate 58 which, in turn, is attached to the base 32 by any suitable means such as screw fasteners. A stop 60 is pivotally attached to the support plate 58 by means of a pin 62 which is pressed into a hole formed in the support plate 58. The stop 60 includes a stop arm 64 projecting toward a point in the workstation 26 just above the anvil 40. A tab 66 projects outwardly from the stop 60 and extend under the plate 56, as best seen in FIG. 5. A set screw 68 is threaded into the plate 56 directly above the tab 66. The set screw 68 may be adjusted to precisely control the position and orientation of the stop arm 64. A torsion spring 69 is disposed about the pin 62 and arranged to urge the stop 60 in a clockwise direction so that the tab 66 is urged against the set screw 68. A stripper arm 70 is positioned within a cavity 72 formed in the plate 56, as shown in FIG. 5. The stripper arm 70 is pivotally attached to the plate 56 by means of a pin 74 and is biased against one side 75 of the cavity 72 by a resilient member 76, in the present example a compression spring. The stripper arm 70 includes a face 78 which is substantially flush with an end 84 of the stop arm 64 when the stripper arm is against the side of the cavity 72 as shown in FIG. 5. The face 78 includes a chamfer 80 that provides clearance for the insulation crimp tabs 82 of the contacts 16 when fed into the workstation 26 by the feed mechanism 24. The cavity 72 includes sufficient clearance so that the stripper arm 70 may be pivoted away from the side 75 and against the opposing force of the spring 76 by applying a force against the face 78. This would cause the face 78 to move away from the end 84, in a counterclockwise direction as viewed in FIG. 5, for a purpose that will be explained below. One end of the spring 76 is disposed in a blind hole in the stripper arm 70 and the other end is disposed in another hole in the plate 56 which is closed by a set screw in the usual manner. As best seen in FIG. 1, a linear actuator 90, an air cylinder in the present example, is securely attached to the frame 30. The actuator 90 includes a piston rod 92 which, when actuated, is arranged to move toward the workstation 26 and away therefrom. A pusher member 94 is coupled to the end of the piston rod 92 by any suitable means and is arranged to slide within a slideway within the frame 30. A cavity 96 is formed in the end of the pusher member to receive the end of the insulating housing 18.

Figure 7:
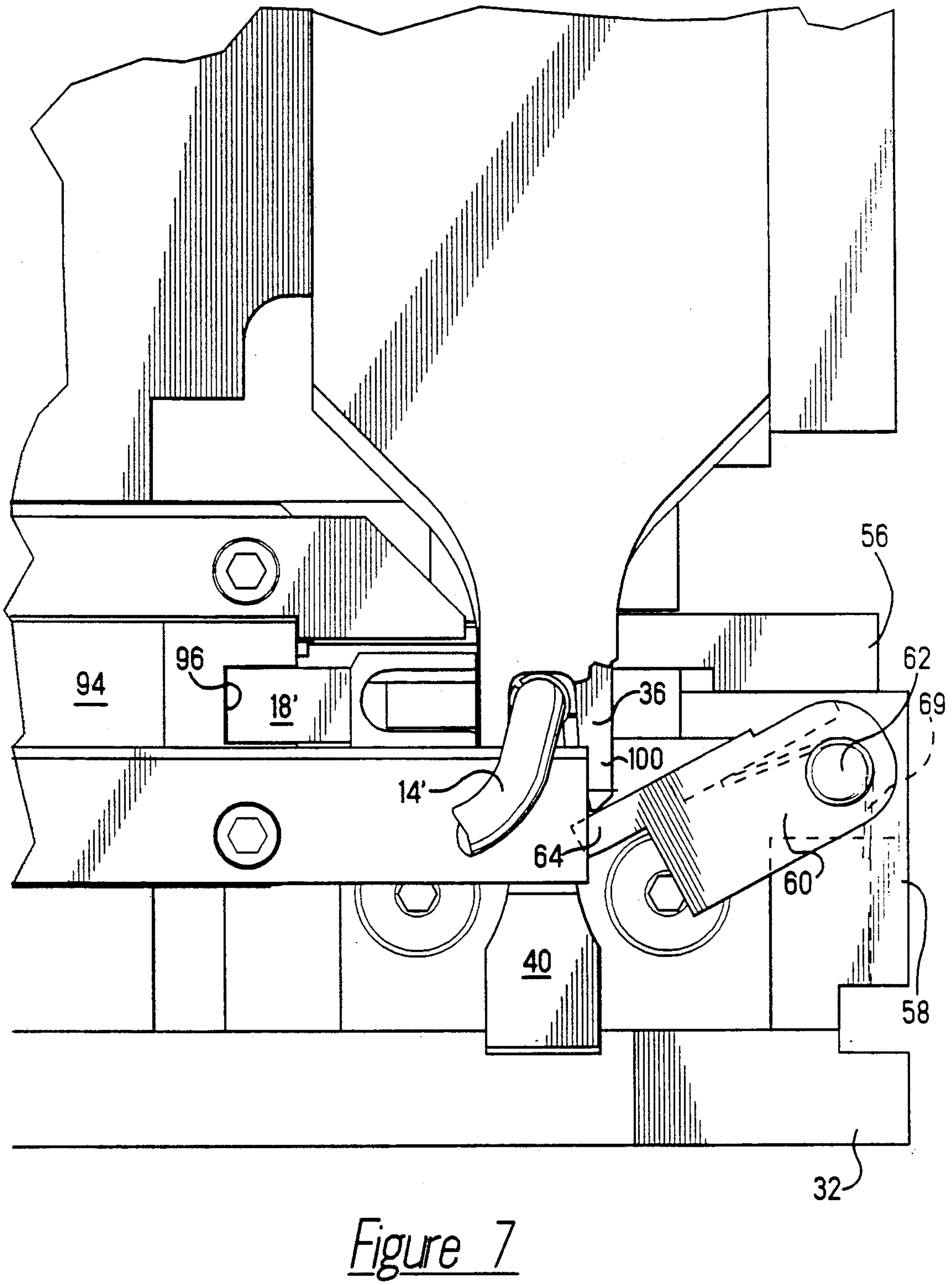
Figure 8:
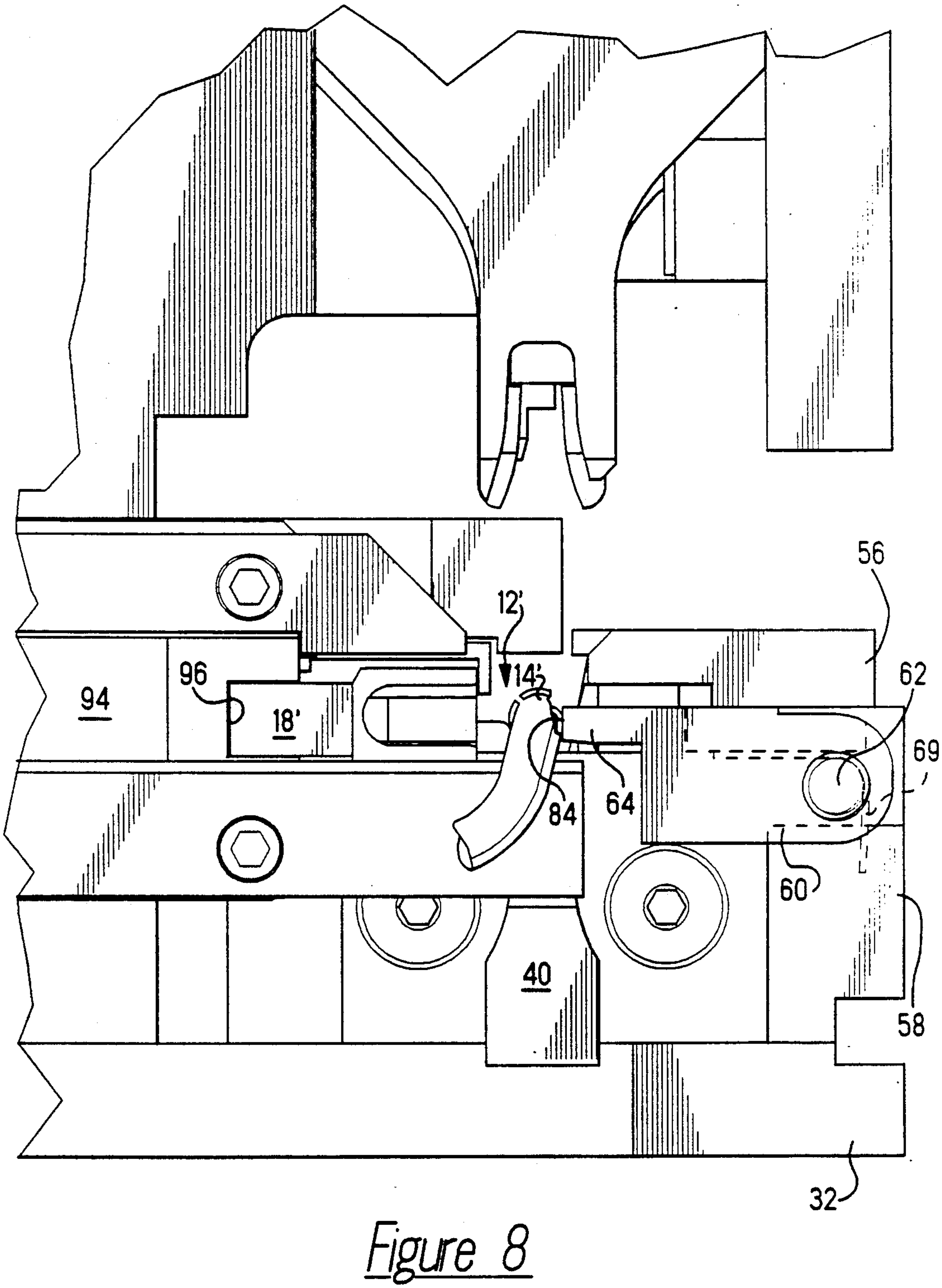
Figure 9:
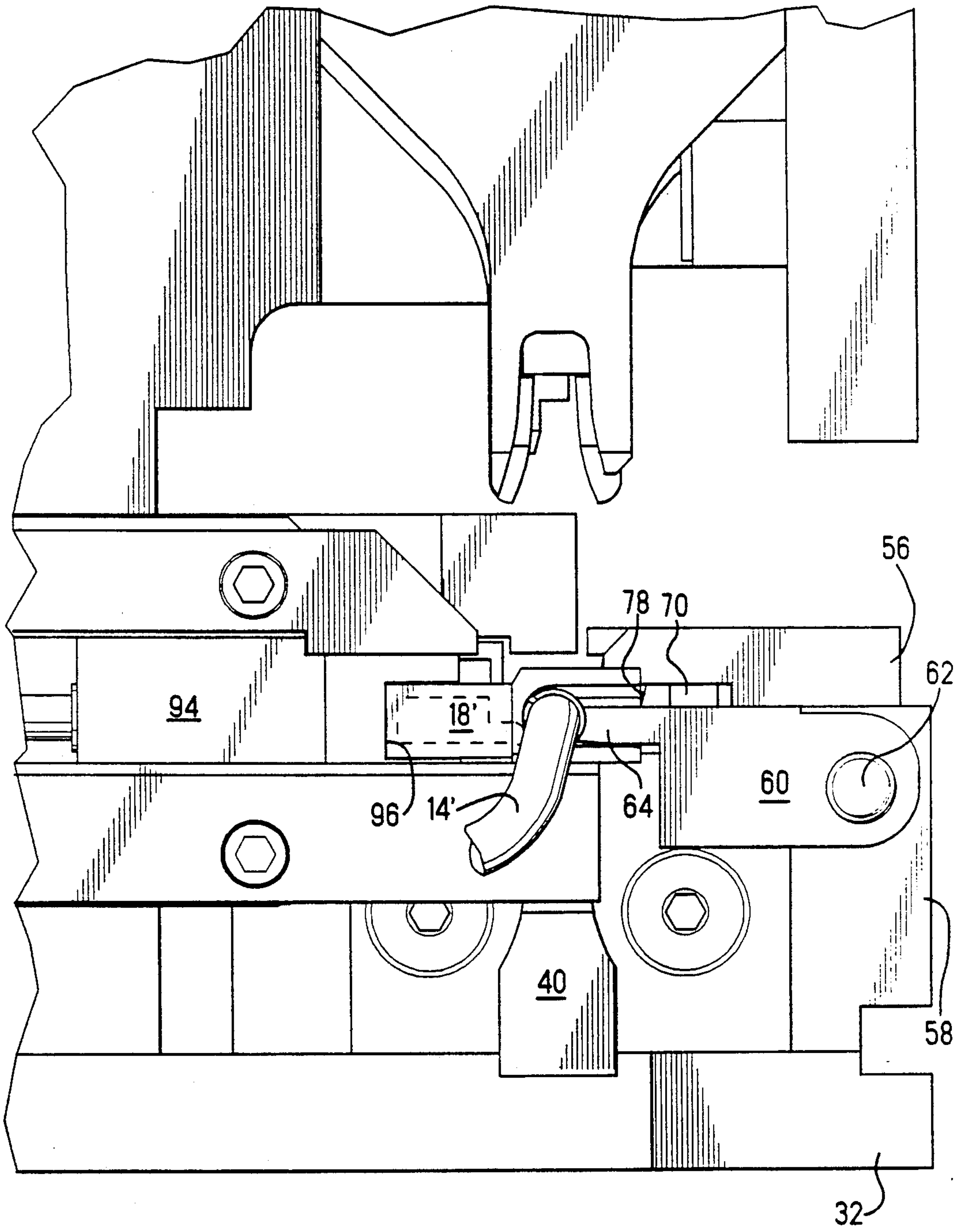
Figure 10:
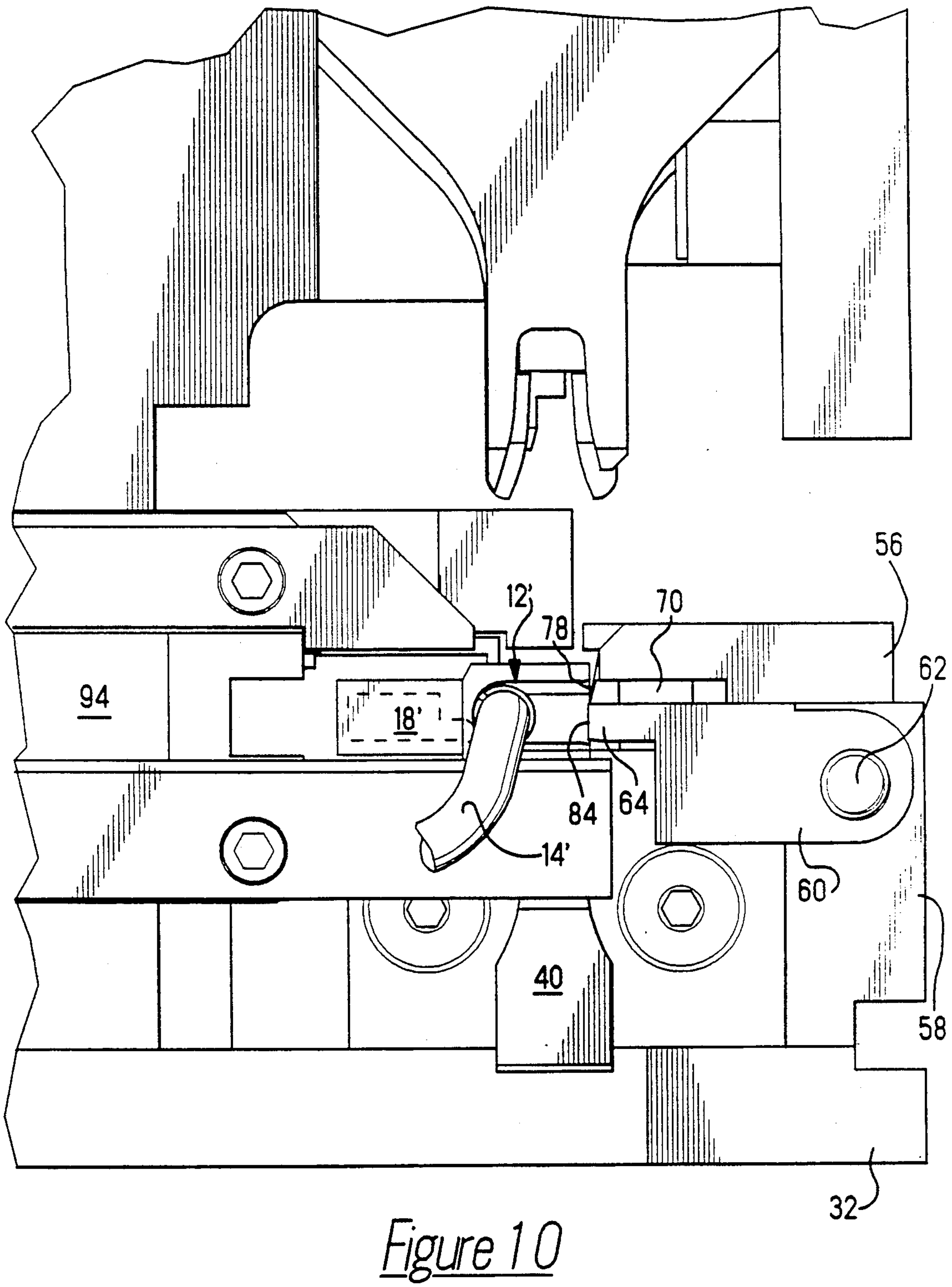

In operation, a strip of terminals 12 is loaded into the guideway 22 and the first terminal 12' is advanced by the feed mechanism 24 into the workstation 26 so that the portion of the contact 16 to be crimped is directly over the anvil 40, as best seen in FIGS. 6 through 10. Note that the contact 16 is adjacent the end 84 of the stop 60, as viewed in FIG. 5. A conductor 14' is inserted into position within the crimping tabs of the contact 16 and the press actuated. As the ram 34 of the applicator 10 is caused to reciprocate downwardly, as seen in FIG. 7, one leg 100 of the crimping tool 36 engages the top of the stop arm 64 causing the stop 60 to pivot counterclockwise about the pin 62 so that the stop is well clear during the actual crimping of the contact 16. As the ram 34 reciprocates upwardly, as seen in FIG. 8, the stop 60 pivots clockwise under the urging of the torsion spring 69 so that the end 84 is again adjacent the contact 16. As the ram 34 continues its upward motion, the cylinder 90 is actuated by means of a cam attached to the ram which engages air valves, the cam and air valves not being shown. Actuation of the cylinder 90 causes the pusher member 94 to engage and slide the insulated housing 18 along a path into assembled engagement with the contact 16, as shown in FIG. 9. During this assembling operation the end 84 of the stop 60 blocks the path by abutting the contact 16 and holding it in position over the anvil 40. Note that the end 84 is now within the interior of the housing 18. As the insulating housing 18 is made to slide to the right, as viewed in FIGS 5, 8, and 9, it engages the face 78 of the stripper arm 70 causing the stripper arm to pivot counterclockwise, as viewed in FIG. 5, against the biasing force of the spring 76. As the ram 34 continues its upward motion, the cylinder 90 is then reversed, again by means of the cam attached to the ram, so that the pusher member 94 is withdrawn to the position shown in FIG. 10. As the pusher member withdraws to the left the stripper arm 70 follows under the urging of the spring 76 so that when the pusher member is fully withdrawn, the stripper arm 70 has moved the assembled terminal 12' and wire 14' clear of the stop arm 64 and end 84. At this point the assembled terminal and wire may be easily removed from the work station and the process repeated as desired.

An important advantage of the present invention is that the substantial force, about seven pounds, required to slide the insulated housing over the contact and into assembled engagement, is completely resisted by the stop arm while a subsequent automatic lateral movement of the assembled terminal permits easy removal from the applicator. Another important advantage is that both the crimping operation and the assembly operation are performed in one machine cycle of the ram.

We claim:

1. A method of assembling an electrical terminal in a workstation having a stop and a movable ejection member adjacent said stop, said member being resiliently biased in one direction, said terminal including a contact and a housing, the method comprising the steps:

(a) positioning said contact and said housing in said workstation, a side of said contact being adjacent said stop;

(b) positioning a wire to be terminated to said contact in said workstation;

(c) terminating said contact to said wire;

(d) applying a force to said housing thereby moving said housing in a direction toward said stop so that said end of said contact abuts said stop and concurrently engaging and moving said ejection member in a direction opposite said one direction in opposition to said resilient bias, wherein said housing moves into assembled engagement with said contact and substantially surrounds said stop;

(e) removing said force from said housing so that said assembled housing and contact are moved away from said stop in said one direction.

2. The method according to claim 1 wherein said workstation includes a linear actuator having an armature attached to a pushing member and wherein said applying a force to said housing of step (d) includes energizing said linear actuator causing said pushing member to push against said housing in said direction toward said stop.

3. The method according to claim 1 wherein said engaging and moving of step (d) is effected by said housing abutting and moving said ejection member and wherein upon removal of said force from said housing of step (e) said ejection member is urged against said housing thereby effecting said movement of said assembled housing and contact away from said stop.

4. The method according to claim 1 wherein prior to said terminating of step (c) said stop is moved away from said side of said contact and after said terminating is complete, said stop is returned to its previous position adjacent said side.

5. The method according to claim 4 wherein said workstation includes a crimping tool for effecting said termination of said wire by engaging said contact and crimping it onto said wire and wherein prior to said terminating of step (c) said crimping tool engages and effects said movement of said stop away from said side of said contact.

6. The method according to claim 5 wherein said movement of said stop is pivotal movement.

7. An apparatus for assembling an electrical terminal having a contact and a housing, comprising:

(a) a workstation;

(b) stop means in said workstation;

(c) means for positioning said electrical terminal within said workstation so that a side of said contact is adjacent said stop means;

(d) means for terminating said contact to said wire;

(e) means for applying a force to said housing thereby moving said housing in a direction along a path toward said stop means so that said end of said contact abuts said stop and said housing moves into assembled engagement with said contact;

(f) an ejection member adjacent said stop, resiliently biased in a second direction opposite said first direction and arranged to engage said housing during said moving thereof and to move said assembled housing and contact away from said stop means in said second direction when said force is removed from said housing.

8. The apparatus according to claim 7 wherein said workstation includes a frame and said stop means includes a member having an abutting surface arranged to block said path when in a first position and to be away from said path when in a second position, said member being pivotally attached to said frame and pivotally moveable between said first and second positions.

9. The apparatus according to claim 8 wherein said stop member is pivotally attached to said frame at a point along an extension of said path so that said means for applying a force to said housing directs that force in said first direction along a substantially straight line through said abutting surface and said pivotal attachment of said stop member.

10. The apparatus according to claim 7 including a frame and a base rigidly attached to said frame, a ram arranged for reciprocating motion within said frame in a direction toward said base and in an opposite direction and wherein said means for terminating includes a crimp tool attached to and carried by said ram and an anvil attached to said base in alignment with said crimp tool, said stop member being pivotally attached to said frame and having an abutting surface adjacent said anvil and wherein said means for positioning said terminal is arranged to position said contact of said terminal in alignment with said anvil and said crimp tool and adjacent said abutting surface of said stop member.

11. The apparatus according to claim 10 wherein said means for moving said housing includes a slide having a stationary portion attached to said base and a movable portion arranged to undergo movement toward and away from said anvil from a position opposite said stop member, said movable portion including a pusher attached thereto for engaging said housing, said movable portion being operationally coupled to a linear actuator for effecting said movement thereof so that when said contact is in alignment with said anvil and said crimp tool, actuation of said linear actuator will cause said housing to move toward said abutting surface along a straight line extending between said abutting surface and said pivotal attachment of said stop member and into assembled engagement with said contact, said contact being in abutting engagement with said abutting surface.

12. The apparatus according to claim 11 wherein said crimp tool is arranged to engage an end of said stop member and pivot it away from said contact in a direction substantially normal to said straight line prior to said crimp tool engaging said contact.

13. The apparatus according to claim 11 wherein said ejection member has one end thereof pivotally attached to said frame and another end thereof having an ejection surface adjacent said abutting surface and arranged so that when said linear actuator is engaged it causes said housing to move in said first direction into said assembled engagement, said housing engaging said ejection surface and pivoting it away from said abutting surface.

14. The apparatus according to claim 13 including a resilient member for urging said ejection member so that said ejection surface is urged toward said abutting surface, wherein when said linear actuator is disengaged said ejection surface moves said assembled housing and contact away from said abutting surface.

* * * * *